June 30, 1964 A. T. DEUTSCH 3,138,919
ELECTRODYNAMIC SYSTEM
Filed June 28, 1960 3 Sheets-Sheet 1

INVENTOR
Alexander T. Deutsch,

BY
ATTORNEY

June 30, 1964 A. T. DEUTSCH 3,138,919
ELECTRODYNAMIC SYSTEM
Filed June 28, 1960 3 Sheets-Sheet 2

INVENTOR
Alexander T. Deutsch,
BY
ATTORNEY

INVENTOR
Alexander T. Deutsch,
BY
ATTORNEY

United States Patent Office 3,138,919
Patented June 30, 1964

---

3,138,919
ELECTRODYNAMIC SYSTEM
Alexander T. Deutsch, 1308 16th St. NW.,
Washington, D.C.
Filed June 28, 1960, Ser. No. 39,392
20 Claims. (Cl. 60—35.6)

This invention relates to a method and combination of apparatus elements for practical mechanical use of energy made available by a gaseous plasma which has energized the gas in the so-called "pinch" effect. More particularly, according to this invention, I control the energy imparted to gases to impart thereto a raised energy state whereby the gas is a useful working medium for reaction engines of various types. All of such energized gas may be utilized alone by direct expansion to produce useful work or in combination with other gases to support combustion and thereby produce a combustion gas in a raised energy state useful for doing work by expansion.

The energized gas is, or results from a plasma phase, produced in what is called a "magnetic bottle" in which ordinary gas is subject to a pinch effect which results from application to the gas, usually air or oxygen of an electrical field to ionize the gas and a magnetic field to compress the ions to a plasma.

The magnetic bottle for purposes herein, is usually a tubular duct or container of conductive or semi-conductive material, usually metal, suitably insulated, and sometimes jacketed for cooling, into which gas may be led through one end and emitted through an opposite end in high energy state, the gas being ionized by an electric field, typically an electric arc applied to the entering gas, and the gaseous ions are then heated as well as compressed and accelerated in velocity by being subjected to a magnetic field applied about the tubular chamber as the gas passes therethrough. The gas in its high energy state may be finally deionized before being emitted from the bottle. It can be directly expanded to produce useful energy or it can be led to a combustion chamber for further heating and energy increase.

The exact nature of the plasma is not fully understood and is still being investigated. Nevertheless, it appears to be gaseous ions compressed centrally away from the walls of the tubular container and increased in velocity and heat. All of the physical characteristics of temperature, velocity and pressure follow the known electromagnetic equations and as produced in the magnetic bottle, are readily calculated as by the following:

$$E = \frac{d}{dt} \cdot 2I.l.n. \cdot \frac{R_0}{R}$$

wherein:
According to Maxwell, R is the radius of the conductor and $R_0$ is the radius of the plasma therein, E is the electrical field applied to the tube surface in electron volts, I is the electrical current on the surface of the plasma induced by the electrical field E, $n$ is the number of lines of magnetic force extending a distance $l$, $t$ is time in which the plasma goes to zero. The necessary data items are available from the following relationships.

$$t = R_0 \cdot \sqrt[4]{\frac{4\pi\rho}{E^2}}$$

$$X = \sqrt{\frac{m}{8\pi.N.E^2}}$$

$$B = 2 \cdot \frac{I}{R}$$

$$\frac{dE}{dt} + p \cdot \frac{dv}{dt} = -\Delta q$$

wherein:
X is the length of the plasma column, $\rho$ is the plasma density, $m$ is the ion mass, $v$ is the plasma velocity, P is the scalar pressure, $\Delta q$ is a term called the graduate operator differentiated with respect to heat flow and B is the magnetic field strength.

As further relationships:

$$E + v.B = 0$$

is a conductivity equation in which $$v = -5 \cdot 93.10^7 \cdot \sqrt{E}$$

(for low electron velocities)
The variation of temperature with time is given by:

$$T_0 = \left(\frac{10^{14}}{N} \cdot \frac{I^2.t^{1/2}}{a}\right)^{4/7}$$

The equation of equilibrium in a torus shaped magnetic bottle is $$8\pi p + H_i^2 = H_j^2 + H_e^2$$

Equilibrium equation

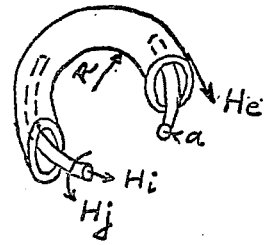

whereby:
$a$ is the small radius of pinch
$b$ is the small radius of the tube
R is the radius of the doughnut
I is the current along the tube's axis
$m$ is the ion mass
$n$ is the number of ions in a unit volume
C is the velocity of light
$H_j$ equals $$\frac{2I}{Ca}$$

(rotary magnetic force)
$H_i$ equals the longitudinal magnetical field within pinch
$H_e$ equals the longitudinal magnetical field outside pinch
$p$ is plasma pressure
$T_e$ is the temperature of the electrons
$T_i$ is the temperature of the ions These equations allow calculation of the dimensions and control of the magnetic bottle respectively, the starting electrical and magnetical fields, the plasma current, plasma velocity and scalar gas pressure produced.

Weak magnetic fields offer efficient results as they allow stabilization of the pinch, since only heat results therefrom. In order to stabilize the pinch effect, the magnetic field must be small so that excessive excitation of the fluid is avoided. Heat should be produced, but rearrangement of the electrons of the gas atoms should be avoided. In a weak field, which is recommended, the ratio of energy of the plasma to the energy of the magnetic field should be about $K = 0.15$. E may be of the order 5 to 20 ev. and B about 10,000 to 50,000 gauss.

According to this invention the combustion supporting gas such as air accelerated in velocity and heated to a useful controlled energy state, comprising temperature, pressure, and velocity, after emission from the tube with or without deionization is usually but not necessarily further heated by supporting combustion of fuel and is then expanded in a motor, reaction engine or the like, to do useful work. The extra heat developed by combustion of a fuel supported by the high energy outlet gas can be used for supply of the exciting electric current needed to convert the air or other gas to the necessary energy state of the gas to do useful work. That is, a part of the outlet work of the gas energized in the magnetic bottle may be utilized to drive a generator for supply of the needed electric current to activate the gas and produce the magnetic field after further heating by combustion.

The gas, however, may be used directly as emitted from the magnetic bottle to do useful work. That is, the gas as produced in the high energy state may be expanded directly in a reaction motor to produce either rotary torque or thrust as desired.

In any case, it may be first deionized before further use as it is emitted from the magnetic bottle. Also, as it emerges from the bottle, it may be admixed with cold gas, using it as a heating medium to produce a gaseous mixture only part of which has been treated to produce an average useful working temperature of the gaseous mixture and that hot gaseous mixture may be directly expanded or used for support of combustion of additional fuel to produce a combustion gas of requisite energy quality to do useful work.

The energy state of the gas is controlled by several variables including the dimensions of the tube, the applied voltage and field strength. Where the tube is not long enough, the ion path can be extended by repeating the path, such as by circulating the ions through a controlled number of rotations around a torus. That tube of selected length may be a straight tube or it may be circular, toroidal (doughnut shaped), the gas being caused to revolve in a circle through the circular center a sufficient number of rotations to produce a path of required length to obtain a useful energy level while being subjected to the magnetic field. Alternatively the tube may be coiled spirally or helically. Such helix may be a single coil, all folds lying in a single plane or each may be displaced axially and extending vertically as a continuous conically shaped helix. Where each flight has the same diameter, it will be shaped cylindrically. Many of such modifications are useful to control the length of the magnetic tube to provide a sufficient length of path to produce the desired energy level of the gas treated therein.

In operation of the magnetic bottle, the gas may be passed into the tube by blowers or pumps (not shown in the drawings) or the gas may be scooped from the atmosphere where the magnetic bottle is moving through the air at a requisite speed. The gas, however, has its flow through the bottle largely induced by pulsing of the applied electrical and magnetic fields. Thus the electrical energy rather than flowing continuously is applied intermittently in pulses according to known electromagnetic bottle construction and operation. A description of this is found in Magnetohydrodynamics, by R. K. M. Landshoff (1957), Stanford University Press; Proceedings of the Second Geneva Conference (United Nations Second International Conference on the Peaceful Uses of Atomic Energy (1958) and specifically the papers of Dr. M. N. Rosenbluth on Possible Characteristics of a Diffusion Limited Self-Heated D-T Reactor and of Drs. S. I. Braginski and V. D. Shafranov on High Temperature Pinches and the publications of Maxwell, Boltzman, Faraday and other standard bears in this field.

Several usual engines in which the highly energized gas is used, as well as improved magnetic bottle construction, is illustrated diagrammatically in the drawings in which:

FIG. 1 illustrates diagrammatically a stationary reaction motor in elevation wherein the inlet gas is passed through a helically coiled tube comprising a magnetic field sufficiently elongated to excite the gas to a useful energy state, deionized, and then passed into a combustion chamber as a composite exhaust feed to a reaction motor.

FIG. 2 illustrates in elevation diagrammatically a modified construction using a toroidal shaped magnetic bottle feeding gas radially to combustion chamber and which, similar to FIG. 1, directs the combustion gas produced through an outlet of a reaction motor, including means for partially expanding some of combustion or high energy gas through a turbine to develop electrical current needed for the operation of the magnetic bottle.

Figure 1:
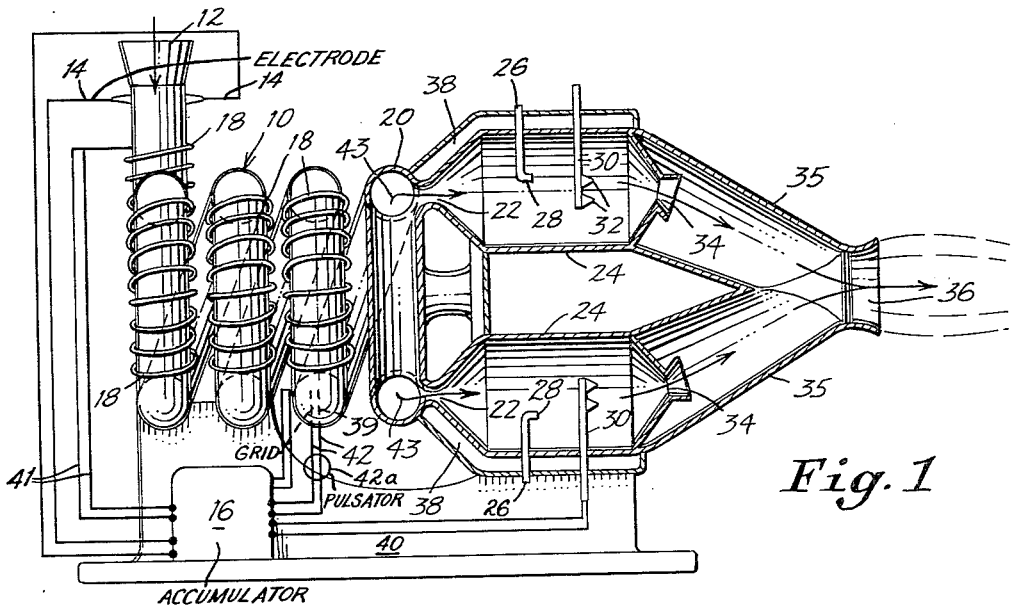

The several figures of drawings illustrate different features, some of which are interchangeable, like numbers referring to like parts. Referring first to FIG. 1 the magnetic bottle 10 here shown comprises a helical tube with 4 flights which may be coiled sufficient to provide an adequate length of path of the fluid to be energized which is a gas or liquid vaporizable to a gas, and is usually air. The air enters an inlet 12 and is ionized by an electric arc between electrodes 14 which are hooked up to any suitable source of current which may ultimately be accumulator 16, directly connected thereto or through a transformer. Such circuit may further contain a pulsating device 42a for the current. Along the outside of the substantially entire or partial length of the helical tube is wound a usual solenoid type magnetic winding 18 shown here merely as helical wires which produce a magnetic field about the helical tube for any desired length. The gas is emitted from the final helical turn 20 in several narrow throat or nozzle outlets 22 which themselves comprise 2 or 4 or more radially disposed combustion chambers 24 whereby the gas leaving the helical bottle 10 and entering the combustion chambers through the throats 22 comprise a jet of high energy gases. The gas may be first deionized by passage through a grid 39 comprising conductive elements with a charge to neutralize the ions, usually a negative charge.

Each combustion chamber 24 may be cylindrically shaped, as shown, and into about the center of each is led a combustible fuel such as fuel oil, kerosene or the like through tubes 26 from the ends of each of which is mounted nozzle 28 for spraying the fuel in the high energy gases for admixture of fuel therewith. A suitable igniting device 30 is mounted ahead of the nozzle supplying, through hot filaments or spark plugs shown diagrammatically at 32, a point of ignition. The hot ignited gases under great heat and velocity are directed out of the combustion chambers through nozzle 34, the combustion product of each combustion chamber being directed and through duct 35 as a high energy jet directly from outlet 36. The individual combustion chamber outlets 34 may in alternate construction be mounted to emit their hot combustion gas as independent outlet jets.

Each of the reaction chambers 24 may be formed of high temperature resistant metal or ceramic material and/or may comprise a metallic shell externally lined with fire-brick or other heat resistant material according to known high temperature construction. If desired, the reaction chambers may be partially jacketed as shown at 38 for supply of cooling fluid to the walls thereof, the jacket portions 38 being filled with some cooling fluid for this purpose. The entire reaction motor thus illustrated may be mounted upon any base 40 for support. The gas produced is at high velocity and controlled high temperature. The high velocity and high temperature imparted to the gas after it enters the bottle induces the flow of additional gas into the inlet 12. Thus, no air pumps or blowers are needed to feed gas to the inlet 12. However, in optional well known alternate construction (not shown) it may be useful to supply gas to the inlet at a controlled precompressed high pressure of sub-atmospheric pressure as may be desired.

The gas after passing through the magnetic bottle 10 for a certain distance has become highly ionized as a high energy plasma, and it may be desired to remove the ionization before further use. This may be done by various methods. For instance, the magnetic field may be reversed in direction. Alternatively, the line 42 imparts an opposite polarity to grids 39 return of current to the accumulator so that the gas emitted from the outlet throats 22 is non-ionic. Alternately, a grounding screen 65 in FIG. 7, may be mounted in the outlet of the exhaust ducts 57 with the current grounded thereby serving to deionize the gas.

In operation the electrical and magnetic fields are controlled as well as the length of path (dimensions of the bottle) to produce gas which may range in temperature as high as 2000° F., more usually in the range of about 300–1000° F., and the magnetic bottle will be constructed of conductive material with or without heat insulation or refractory lining materials adequate to accommodate the desired temperature of operation. The gas admitted into each combustion chamber will have its energy increased to a desired point by a combustion of fuel. The hot gas emitted from the bottle through nozzles 22 may be further mixed with additional air so that the volume of the gas flowing to the combustion chamber 24 is increased by additional inlet ducts (not shown). The helical cylindrical form of magnetic bottle is a preferred form because the path of travel of the gas during its excitation may be readily controlled with substantial space economy. However, other shapes of magnetic bottles may be used as shown.

Figure 2:
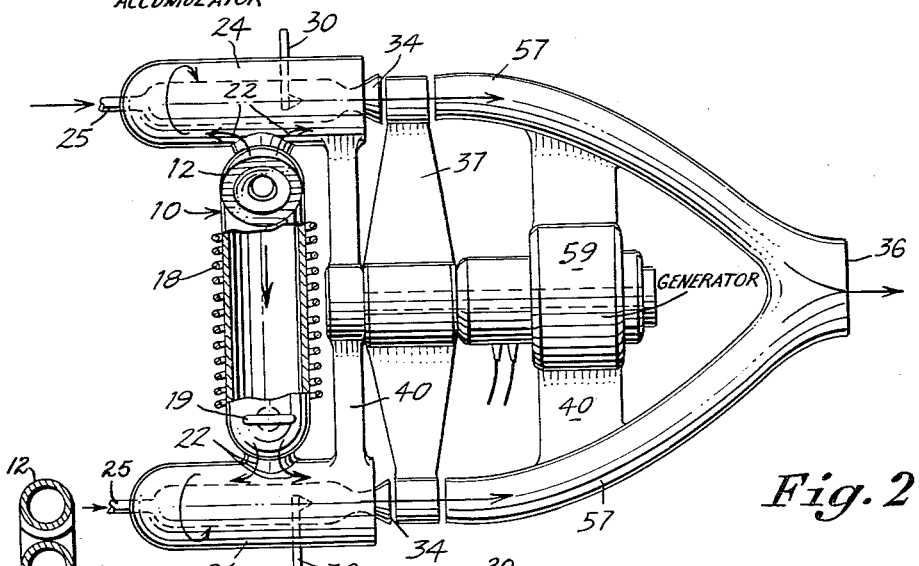
Figure 3:
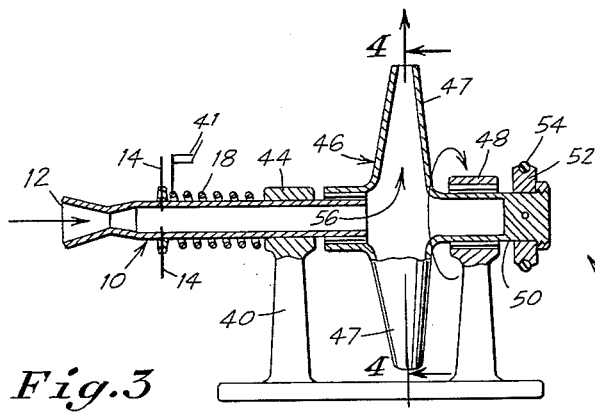
FIG. 3 illustrates diagrammatically a simple machine comprising an elongated tube for energizing a gas which after being energized is directly expanded into a turbine which rotates directly by the gaseous expansion, and may be used as useful torque for doing work.
Figure 4:
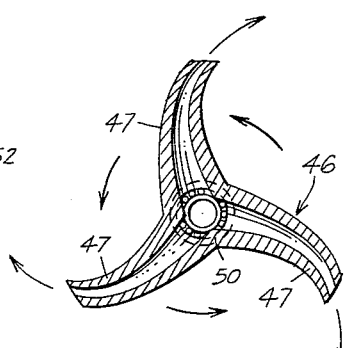
FIG. 4 is a section taken on the line 4—4 of FIG. 3.

For instance, FIG. 3 shows merely a straight tube and FIG. 2 shows a toroidal or doughnut shaped construction wherein the gas is rotated through a number of rotations until it acquires adequate energy for release. The energy level does not usually exceed 25 electron volts before release and a useful energy level is in the range of 5 to 25 ev. and the magnetic field strength can vary from 10,000 to 500,000 gauss.

Figures 10, 11:
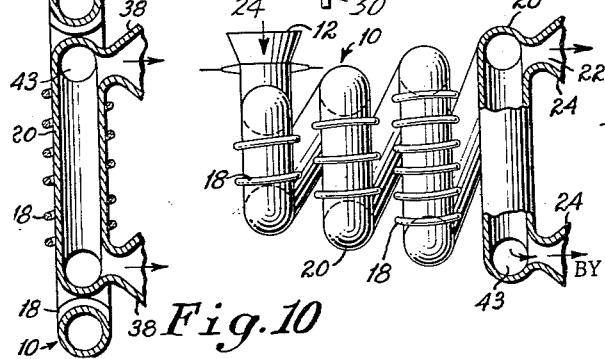
FIG. 10 illustrates diagrammatically a spiral reaction chamber with all of the tubular elements lying in one plane.
FIG. 11 illustrates diagrammatically a helical reaction chamber with the flights thereof spirally disposed vertically from flight to flight from the inlet to the outlet.

FIG. 10 shows a shape of magnetic bottle in which each turn of the tubular bottle lies in the same plane, the gas inlet being at the center and the path being spiral, or conversely, the inlet may be to the outside of the spiral, the gas being continuously constrained spirally inward toward the center as the outlet. FIG. 11 illustrates a modified helical form in which each flight of the helix like that of FIG. 1 is displaced vertically from the next adjacent but continuously varies in diameter therefrom, being larger or smaller, the helix beginning or ending at a large diameter end or at a small diameter end and varying continuously to the opposite end of a small or large diameter, the overall shape of the helix being conical.

The energized gas tends upon emission from the magnetic field to be displaced at right angles to the field through throat 22 in the direction of the arrow 43 of FIG. 1.

The modified construction of FIG. 3 takes some advantage of this T-shaped path of the gas in leaving the magnetic field, the gas being expanded into a T-shaped reaction motor comprising a turbine rotor 47. For this purpose the magnetic bottle 10 is here illustrated as a straight tube which has an inlet 12 and is held stationary or journaled for rotation in a base 40 by a spindle arm 44 which supports the tube stationary. The end of the tube has journaled a rotary turbine 46 further supported for rotation in an opposite journal 48 through a shaft 50 extending from the turbine wheel 46. The shaft 50 may conduct useful torque from the rotating turbine 46 and may have any mechanical device for rotary motion mounted thereon such as a pulley 52, about which may be entrained a belt 54 for deriving useful rotary power from the device.

The heated gas produced in the magnetic bottle 10 and leaving the bottle through a T-shaped outlet in the direction of the arrow is as shown expanded outwardly through the several arms 47 of the turbine rotor 46 whereby the gas, heated to a high energy level is allowed to expand through the turbine rotor 46 to do useful work as rotary power which may be utilized in several ways. As here shown, it may drive the pulley 54. Alternatively the rotating turbine blade 47 may be the rotor blade of a helicopter or the propeller of a plane, ship or agitator or blower or the impeller of a pump.

FIG. 2 illustrates a modified form in which the magnetic bottle 10 is doughnut or toroidally shaped. The gas enters the inlet 12, is allowed to rotate in the circular bottle until it acquires a sufficient velocity before escaping as controlled by a valve 19, passing thence through throat 22 into several combustion chambers 24. These combustion chambers may have a fuel such as a combustible gas or liquid supplied through an inlet duct 25 which is ignited and burned with hot air from throat 22 as described in FIG. 1. The hot combustion gases are exhausted through several nozzles 34, as in FIG. 1. However, according to this modification the hot gases are first expanded through the blades of a tubine rotor 37 and thence passes into several ducts 57 placed opposite the nozzles 34 whereby the rotor 37 will rotate and drive an electrical generator 59 which in turn will supply sufficient electrical energy to activate the gas passing through the magnetic bottle. The entire device is supported by a base and bracketing 40.

Figure 5:
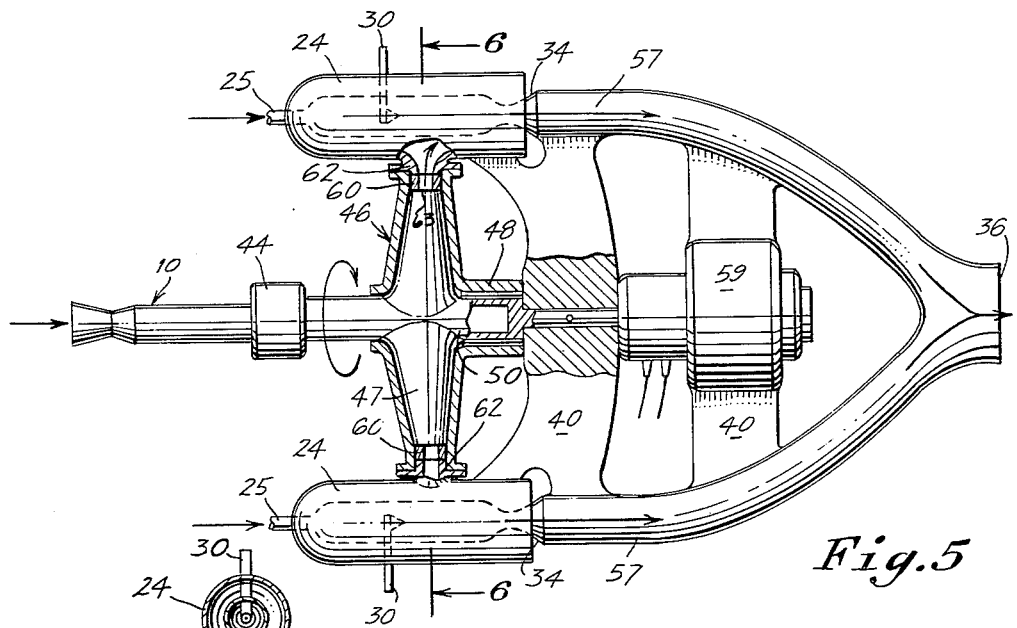
FIG. 5 is an elevation partly in section diagrammatically illustrating a modified turbine construction in which the energized gas after partial expansion in the turbine to produce a torque drive for an electrical generator is then converted to a combustion gas as a useful jet for a reaction motor.
Figure 6:
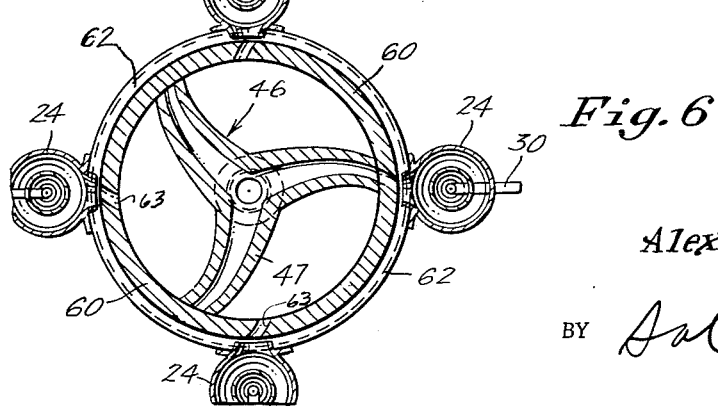
FIG. 6 is a section on the line 6—6 of FIG. 5.

FIG. 5 shows diagrammatically a modified construction wherein the magnetic bottle 10 is a straight tube, as shown in FIG. 3, in which the electrical and magnetic leads 14 and 18 are not shown. The energized gas from the magnetic bottle 10 is passed to a rotor assembly 46 supported for rotation between bearings in the supports 44 and 40. Shaft 50 extends from the rotor 47 to drive an electrical generator 59 to develop the electrical energy needed for the magnetic bottle 10. The rotor 47 is encased in a housing 48 into which rotor 47 emits the high energy gas through several arms against a stator 60 enclosed by an outer imperforate ring 62. The stator 60 contains stator openings 63 through which the gas passes into a series of combustion chambers 24 operated as described for FIG. 2, gaseous or liquid fuel being passed into the combustion chamber through ducts 25 and ignited by igniter 30. The combustion gas produced in each of the chambers 24 is emitted through nozzles 34 into ducts 57 which join in a common outlet duct 36 as a reaction engine jet outlet.

Figure 7:
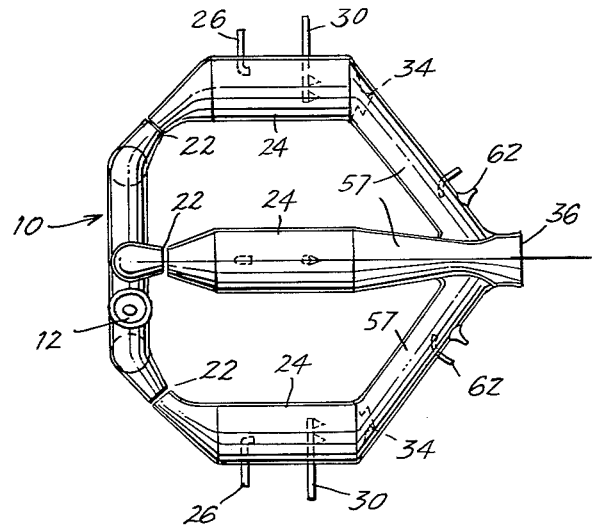
FIG. 7 illustrates diagrammatically nozzle construction of a toroidally shaped magnetic bottle exhausting to a plurality of stationary combustion chambers for recombination into a composite exhaust duct.

FIG. 7 illustrates an entirely stationary reaction device wherein a toroidal magnetic bottle 10 has gas supplied thereto through inlet 12. The toroidal bottle is similar to that shown in FIG. 2 except that the outlet nozzles 22 evolve the gas directly into each stationary combustion chamber 24 to which fuel is passed through ducts 26, ignited at 30 and combustion gas is collected in several ducts 57 which join in the common outlet 36. That gas may be partially ionized and may have its ions neutralized by suitable electrodes 62 which can operate in principle as described above.

Figure 8:
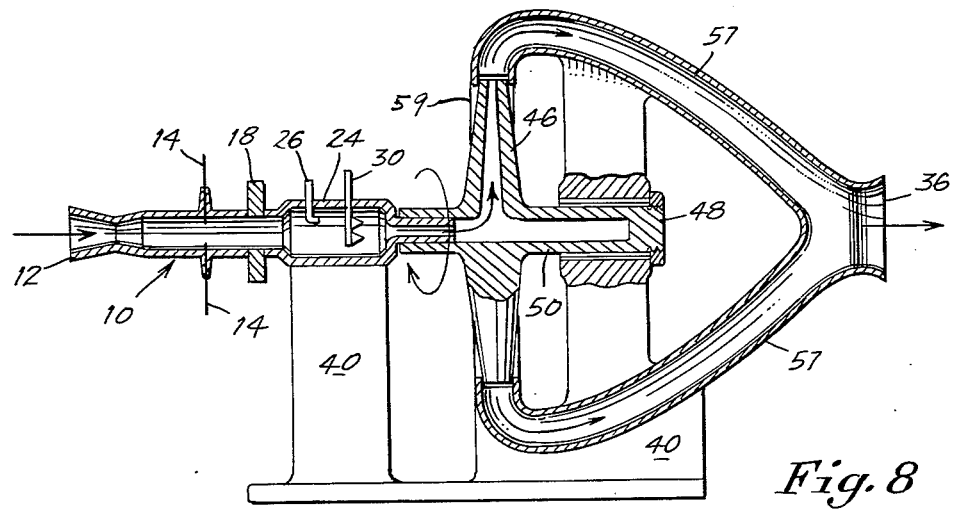
FIG. 8 is a modified form of the construction illustrated in FIG. 3 in which additional combustion is applied to the acid gas after leaving a straight tube magnetic bottle and being expanded into a rotary turbine to produce useful torque and further expanded into an exhaust duct for recovering reaction energy.

FIG. 8 has a combustion chamber 24 mounted immediately following a straight duct magnetic bottle 10 as in FIGS. 3 and 5, the combustion gases being expanded first through a turbine rotor 46 encased in an annular ring housing 59 having two (or more) outlet duct arms 57 communicating therewith and which join in a common jet outlet 36. The rotor 46 is supported on an extended shaft 50 suitably journaled at 48 in a support 40.

Figure 9:
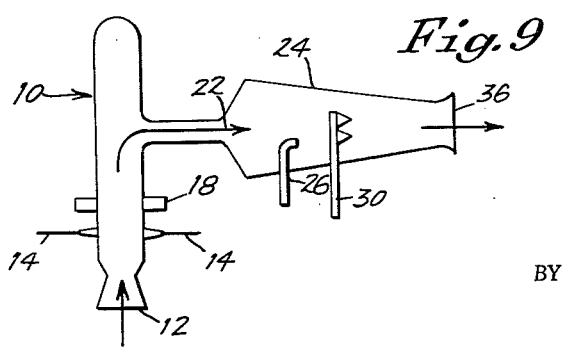
FIG. 9 is a modification of FIG. 1 illustrating a T-shaped bottle combined with a combustion chamber to produce high energy reaction gases.

FIG. 9 illustrates an entirely stationary structure like FIG. 7, illustrating a straight tube type magnetic bottle 10 from which the ions tend to bend at right angles to join a combustion chamber 24 mounted at right angles thereto by way of nozzles 22 and evolves gas through an outlet 36 as a jet.

As shown in the several figures the magnetic bottle may be variously shaped. It may be a cylindrical coil helix wherein each flight has the same diameter, as in FIG. 1; or a helix in which the tube is bent to a spiral coil, all in the same plane, as in FIG. 10; or in which each flight varies in diameter conically, the gas entering from either end for useful design purposes to obtain streamlining and controlled magnetic field path.

As shown in FIG. 1 the electrical energy can be obtained extraneously from any suitable supply such as from an accumulator 16. That same source of energy may also be used to deionize the gas from grids 59 and leads 42. Such accumulator 16 may be the only source of electrical energy and applied in such construction as shown in FIG. 3 wherein the energized gas is not further used to support combustion, but rather the electrical energy used to energize the gas is derived from an accumulator and no other source external to the rotor hereof. The energized gas is used for producing rotary motion by thermodynamic expansion through a turbine, whereby the device is merely an energy converter from electrical energy to rotary torque by way of the energized gas hereof.

Various types of engines may be used to convert the energized gas to do useful work. It may be expelled through an exhaust duct in an ordinary reaction engine such as a jet or rocket engine; and it may be used with or without further heat supplied by use of the gas to support combustion of a fuel, and the combustion gas used to do work. The following is a typical example of operation and construction of a reaction engine as illustrated in FIG. 1.

In the test, a screw type of silicon insulated, water-cooled, stainless steel magnetic bottle has 5 windings having a winding diameter of 30 inches, upon a 2" inner diameter of tube, diameter of exit nozzle. A gas breakdown electric field E of 1875 joules (3 kilovolts) was applied. The air entered the tube at a flow rate of 60 f.s. (feet per second) and left the exit nozzle with 600 f.s. The electric current carried $2.10^3$ (2000) amperes(I). There was applied 5–7 pulses at a pulsing period of current of 10 microseconds, sufficient for acceleration and heating of the plasma up to about 1000° F. The pulses used, lasted about 5 microseconds each. The exhaust velocity was 1900 f.s. The specific pressure taken at a point inside the tube about 2 inches from the start of the magnetic field at the outlet nozzle was 80 p.s.i. at the raised temperature. The source inductance was 0.05 $\mu$h., a 2 wf condenser was used. 350 joules of discharge current were stored in the condenser at a discharge frequency of 150 kc.

The gas may be expanded through various devices, which may operate as shown, as a rocket, a ram jet engine or a turbo jet. The quality, pressure and temperature, as well as volume and velocity of the gas may be varied as desired, depending upon which particular service to which the gas is to be put, according to known thermodynamic principles. The ducts 62 may be used for emission of extraneous air, as is common in jet engines or as mentioned auxiliary air can be admitted to the combustion chambers from extra ducts (not shown).

Thus, the magnetic bottle hereof is applied as a tool for placing a gas in high energy condition to do useful work. The gas is self-pumping in view of the pulsing action of the electrical current thereon conventionally pulsated by conventional current interrupters at the rate mentioned, to cause gas to be taken in at atmospheric pressure or by auxiliary pumps as desired and converted to the useful energy condition by the heat generated therein. The gas itself in high energy condition may be at sufficient pressure for storage as such and subsequent reuse from the high energy condition when desired. The hot magnetic bottle may be used itself as well as the hot working gas as a heat pump for production of useful refrigeration, for instance, as a source of heat energy through the jacketing thereof, as shown in FIG. 1, or the active energized gas may be passed in heat exchange for producing heat energy useful for heating and cooling.

Various modifications will occur to those skilled in the art and, accordingly, it is intended that the description here given be regarded as illustrative and not limiting except as defined in the claims appended hereto.

I claim:

1. A magnetic bottle, means for ionizing gases passed therein, means for passing a combustion supporting gas pulsatingly through said magnetic bottle to convert said gas to a raised energy state, said magnetic bottle comprising a multi-coiled tube having electromagnetic field windings thereabout to convert the ionic gases therein to an increased energy plasma and means for expanding the emitted hot gases to do useful work.

2. The magnetic bottle as defined in claim 1 having means for passing a fuel combustible in admixture with said combustion supporting gas and duct means for expanding the high energy plasma together with hot combustion gases as a reactive jet.

3. The magnetic bottle as defined in claim 1 combined with means for expanding at least a portion of the emitted high energy gas plasma through a turbine.

4. A magnetic bottle comprising a tubular chamber having means near the inlet to ionize the working fluid passed thereto and a magnetic field winding about the outside of said tubular chamber, said tubular chamber being coiled as a cylindrical coil from flights of relatively equal diameters.

5. A magnetic bottle comprising a tubular chamber having means near the inlet to ionize the working fluid passed thereto and a magnetic field winding about the outside of said tubular chamber, said tubular chamber being coiled in a spiral, all flights of which lie substantially on the same plane.

6. A magnetic bottle comprising a tubular chamber having means near the inlet to ionize the working fluid passed thereto and a magnetic field winding about the outside of said tubular chamber, said tubular chamber being coiled in a helically coiled body, each flight of which varies progressively in diameter from the adjacent flight, whereby the over-all shape of the helically coiled body is conical.

7. The thermodynamic process comprising converting a working fluid to a raised energy state comprising first, ionizing the working fluid, then applying to the ionized fluid a fixed magnetic field as it passes through an extended coiled tubular arcuate path, said field being sufficient to substantially raise the temperature thereof and then expanding said raised energy working fluid through a heat engine to produce useful work therefrom.

8. In combination, an electrodynamic system in which an ionized working fluid is treated electrodynamically in a fixed magnetic field as it passes therethrough in an extended multi-coiled tubular arcuate path to convert it to a useful raised energy working state, and a thermodynamic system in which the high energy fluid is converted to a low energy state while doing useful work.

9. A magnetic bottle comprising a tubular chamber having means near the inlet to ionize the working fluid passed thereto and a magnetic field winding about the outside of said tubular chamber, said tubular chamber being coiled as a cylindrical coil from flights of relatively equal diameters.

10. A magnetic bottle comprising a tubular chamber having means near the inlets to ionize the working fluid passed thereto and a magnetic field winding about the outside of said tubular chamber, said tubular chamber being coiled in a spiral, all flights of which lie substantially on the same plane.

11. A magnetic bottle comprising a tubular chamber having means near the inlet to ionize the working fluid passed thereto and a magnetic field winding about the outside of said tubular chamber, said tubular chamber being coiled in a helically coiled body, each flight of which varies progressively in diameter from the adjacent flight, whereby the overall shape of the helically coiled body is conical.

12. Electrodynamic system comprising a multi-coiled duct, means for supplying an ionized gas near an inlet of said coiled duct, means for converting said gas to a high energy plasma as it passes through the arcuate path defined by said coiled duct and outlet means through which the high energy plasma is exhausted, said means for converting said gas to a plasma comprising electromagnetic means mounted about the coils of said duct and imparting a magnetic field to the ionic gas passing therein.

13. The multi-coiled means defined in claim 12 wherein the duct is tubular and the plasma exhausted as a propellant means for the system.

14. The multi-coiled means defined in claim 12 combined with a turbine adapted to convert the emitted high energy working fluid from said coil outlet to a lower energy state while producing useful torque.

15. The multi-coiled tubular means defined to claim 12 having means for deionizing the working fluid and means for expanding the working fluid in a heat engine for producing useful work therein.

16. The electrodynamic system defined in claim 12 wherein the multi-coiled duct means is coiled as a cylindrical tubular coil from several flights of relatively equal diameters.

17. The electrodynamic system as defined in claim 12 wherein multi-coiled duct means is a tube coiled in a spiral, all flights of which lie substantially on the same plane.

18. The electrodynamic system as defined in claim 12 wherein the multi-coiled duct means is a tube coiled helically, each flight of which varies progressively in diameter from the adjacent flight, whereby the overall shape of the helical body is conical.

19. The combination of a multi-coiled tubular duct having electromagnetic field windings mounted thereabout, means for supplying an ionized gas pulsatingly near the inlet of said tubular duct, whereby the said gas is converted to a high energy plasma in passage through said duct, a turbine and means for passing the high energy gas emitted from said duct through said turbine to rotate the same.

20. Electrodynamic system as defined in claim 12 including means for deionizing the high energy plasma by withdrawing the electric charge.

References Cited in the file of this patent

UNITED STATES PATENTS

| | | |
|---|---|---|
| 2,479,143 | Traylor | Aug. 16, 1949 |
| 2,523,008 | Goddard | Sept. 19, 1950 |
| 2,543,864 | Melennic | Mar. 6, 1951 |
| 2,629,225 | Ammann | Feb. 24, 1953 |
| 2,659,198 | Cook | Nov. 17, 1953 |
| 2,698,127 | Bowlus | Dec. 28, 1954 |
| 2,715,993 | Batina | Aug. 23, 1955 |
| 2,791,371 | Foster et al. | May 7, 1957 |
| 2,798,181 | Foster | July 2, 1957 |
| 2,806,161 | Foster | Sept. 10, 1957 |
| 2,831,996 | Martina | Apr. 22, 1958 |
| 2,880,337 | Langmuir | Mar. 31, 1959 |
| 2,952,970 | Blackman | Sept. 20, 1960 |
| 3,005,311 | Ross | Oct. 24, 1961 |
| 3,014,154 | Ehlers et al. | Dec. 19, 1961 |
| 3,026,447 | Kerst | Mar. 20, 1962 |
| 3,029,199 | Baker et al. | Apr. 10, 1962 |
| 3,029,361 | Hernqvist | Apr. 10, 1962 |
| 3,032,978 | Kunen | May 8, 1962 |
| 3,041,824 | Berhman | July 3, 1962 |

FOREIGN PATENTS

| | | |
|---|---|---|
| 738,511 | Great Britain | Oct. 11, 1955 |

OTHER REFERENCES

Engineering publication, Oct. 10, 1958, "The Aeronautical Scene," vol. 186, No. 4831, pages 474–475 relied on.

UNITED STATES PATENT OFFICE
CERTIFICATE OF CORRECTION

Patent No. 3,138,919 June 30, 1964

Alexander T. Deutsch

It is hereby certified that error appears in the above numbered patent requiring correction and that the said Letters Patent should read as corrected below.

Column 2, line 38, for "ion mass" read -- pole strength --; line 40, for "velocity of light" read -- current strength in amperes --; below line 41 insert the following:

N is the magnetic flux

Signed and sealed this 12th day of January 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,138,919
June 30, 1964
Alexander T. Deutsch

It is hereby certified that error appears in the above numbered patent requiring correction and that the said Letters Patent should read as corrected below.

Column 2, line 38, for "ion mass" read -- pole strength --; line 40, for "velocity of light" read -- current strength in amperes --; below line 41 insert the following:

N is the magnetic flux

Signed and sealed this 12th day of January 1965.

(SEAL)
Attest:

ERNEST W. SWIDER
Attesting Officer

EDWARD J. BRENNER
Commissioner of Patents